(12) United States Patent  
Larkin et al.

(10) Patent No.: US 8,250,262 B2
(45) Date of Patent: Aug. 21, 2012

(54) SYSTEMS AND METHODS FOR INPUT/OUTPUT ISOLATION

(75) Inventors: Michael Larkin, San Jose, CA (US); Gaurang Thakkar, Milpitas, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 157 days.

(21) Appl. No.: 12/652,264

(22) Filed: Jan. 5, 2010

(65) Prior Publication Data
US 2010/0281479 A1 Nov. 4, 2010

Related U.S. Application Data (60) Provisional application No. 61/204,409, filed on Jan. 5, 2009.

(51) Int. Cl.
G06F 13/12 (2006.01)
G06F 3/00 (2006.01)
(52) U.S. Cl. ............. 710/62; 710/5; 710/8; 710/15; 710/74
(58) Field of Classification Search ............. None
See application file for complete search history.

(56) References Cited

U.S. PATENT DOCUMENTS
2008/0320499 A1* 12/2008 Suit ............... 719/323
2011/0047195 A1* 2/2011 Le et al. ........... 707/827

OTHER PUBLICATIONS

James E. Smith, Architecture of Virtual Machines, May 2005, IEEE, 0018-9162/05, [online, accessed on Nov. 18, 2011], URL: http://www.ece.cmu.edu/~ece845/docs/smith-vm-overview.pdf.*

* cited by examiner

Primary Examiner — Scott Sun
(74) Attorney, Agent, or Firm — Banner & Witcoff, Ltd.

(57) ABSTRACT

Systems and methods for providing virtual stacks are described. A kernel driver is installed and loaded. Then, a virtual stack is created, the virtual stack having a virtual file system, a virtual physical disk, and one or more virtual mounted volume devices. The virtual file system is configured to mimic characteristics of a host file system. The virtual physical disk is configured for providing an interface of a memory storage device to which the virtual file system device binds. The one or more virtual mounted volume devices are configured for allowing the one or more virtual processes to access data in stored memory through the virtual stack.

20 Claims, 6 Drawing Sheets

SYSTEMS AND METHODS FOR INPUT/OUTPUT ISOLATION

CROSS-REFERENCE TO RELATED APPLICATIONS

This nonprovisional application claims the benefit and priority of U.S. Provisional Patent Application Ser. No. 61/204,409 filed on Jan. 5, 2009, titled "System and Method for Input/Output Isolation," which is hereby incorporated by reference in its entirety. This nonprovisional application is related to U.S. patent application Ser. No. 12/381,065 filed Mar. 5, 2009, titled "System and Method for Managing Code Isolation," which claims the benefit and priority of U.S. Provisional Patent Application Ser. No. 61/068,993 filed on Mar. 10, 2008, titled "System and Method for Managing Code Isolation," both of which are hereby incorporated by reference in their entirety.

FIELD OF INVENTION

This invention relates generally to systems and methods for isolation, and more particularly, systems and methods for input/output isolation.

BACKGROUND OF THE INVENTION

Today's computers provide for input/output processing. However, deficiencies in the current technology cause performance and maintenance issues. For example, current input/output processing technology only allows for a single processing pipeline for all input/output requests in a computer. For numerous reasons which will be described later herein, a single processing pipeline for all input/output requests may not be sufficient nor desired within a given computer.

SUMMARY OF THE INVENTION

An object of the present invention is to provide systems and methods that provide input/output isolation in computers.

Another object of the present invention is to provide systems and methods that provide for the creation of virtual stacks in computers.

A further object of the present invention is to provide systems and methods for improving input/output processing in computers.

Yet another object of the present invention is to provide systems and methods that allow for insertion of new filters into a stack of a computer's operating system.

These and other objects of the present invention are achieved in a method for providing virtual stacks. A virtual stack is defined as a virtual input/output processing stack. A kernel driver is installed and loaded. Then, a virtual stack is created, the virtual stack having a filter manager, optionally one or more legacy filters, a virtual file system, a virtual physical disk, and one or more virtual mounted volume devices. The virtual file system is configured to adapt itself to mimic characteristics of a host file system. The virtual physical disk is configured for providing an interface of a memory storage device to which the virtual file system device binds. The one or more virtual mounted volume devices are configured for allowing the one or more virtual processes to access data in stored memory through the virtual stack.

DETAILED DESCRIPTION OF THE INVENTION

Embodiments of the present technology provide for improved input/output processing in a given computing environment. At times, a traditional single request processing pipeline (using a single stack) is insufficient or otherwise undesirable to handle input/output (I/O) requests. Therefore, various embodiments of the present invention allow for at least two processing pipelines using at least two stacks to handle I/O requests. Certain pipeline or stack elements that handle an I/O request are also called filters. It is furthermore possible to load multiple copies of products in the kernel. One exemplary advantage of such an I/O processing system having at least two stacks to handle I/O requests is that one may impose separate filtering chains for devices of a same type. For example, utilizing various embodiments of the present technology described herein, it is possible to isolate two anti-virus products per computing device, a first filter and a second filter. Such exemplary configurations may be desirable for software testing, isolation, monitoring, and virtualization:

Software Testing—A software developer may wish to test an I/O processing component (such as a filter or block device driver) without being subject to additional filtering or I/O processing already in place on the host computer.

Isolation—A user may desire to have a particular device object free from filtering or processing.

Monitoring—A user may desire to monitor a particular device object, free from monitoring other I/O processing components Virtualization—A user may desire to have a completely separate I/O stack used by a set of applications, different from the I/O stack used by other applications.

A computer having a traditional operating system has a single I/O manager that is responsible for managing input/output to both hardware and software devices of the computer. However, the traditional single I/O manager may oftentimes be complex and rife with subtle interactions known only to the engineers of the traditional operating system. Various embodiments of the present technology allow for the flexibility of a secondary I/O manager or a secondary I/O processing pipeline (using a second stack). Such flexibility allows for third parties to implement their own I/O processing logic without having to alter the traditional (or "host") processing logic.

Also, another exemplary advantage of the present technology is that it permits for two stacks (a host stack and a virtual stack) to exist in isolation from each other within a single operating system of a computer. The host stack is isolated from a virtual stack, such that the host stack cannot interrupt or otherwise interfere with the virtual stack, and vice versa. In other words, the technology permits duplicates without interference between the duplicates. Furthermore, the present technology allows for one to control the visibility of resources. For instance, the host stack cannot "see" or otherwise recognize the existence of the virtual stack, and likewise, the virtual stack cannot "see" or otherwise recognize the existence of the host stack. Also, the present technology permits one to influence the construction of a stack.

Further, it may be desirable to intercept I/O requests in ways or methods that are not normally available with traditional operating systems having a single processing pipeline. Intercepting I/O requests is made possible by embodiments of the present technology. Further details shall be provided later herein which will shed more light as to why the various embodiments of the present technology are improvements of traditional I/O processing systems beyond the exemplary advantages noted thus far.

One should keep in mind that any type of computer having any type of operating system (including, but not limited to, a Windows-based operating system, a Linux or Unix-like operating system, a Macintosh operating system and the like) may utilize various embodiments of the present technology. Furthermore, it should be noted that although there will be references to exemplary embodiments where the I/O processing system includes only two stacks (namely, a host stack and a virtual stack), one skilled in the art will appreciate that more than two stacks (e.g., multiple virtual stacks) within a computer's operating system is well within the scope of the present technology. Also, although this paper will later discuss file system and filter drivers, it will be understood that any driver or device in the kernel subsystem may be a participant of the present technology.

Finally, systems and methods of code isolation may be used in conjunction with various embodiments of the present technology. Exemplary systems and methods of code isolation are more fully described in U.S. patent application Ser. No. 12/381,065 filed Mar. 5, 2009, titled "System and Method for Managing Code Isolation," which is hereby incorporated by reference. For instance, embodiments of a file system trampoline, as described in U.S. patent application Ser. No. 12/381,065 filed Mar. 5, 2009, titled "System and Method for Managing Code Isolation," may be utilized with various embodiments of the present technology.

Figure 1:
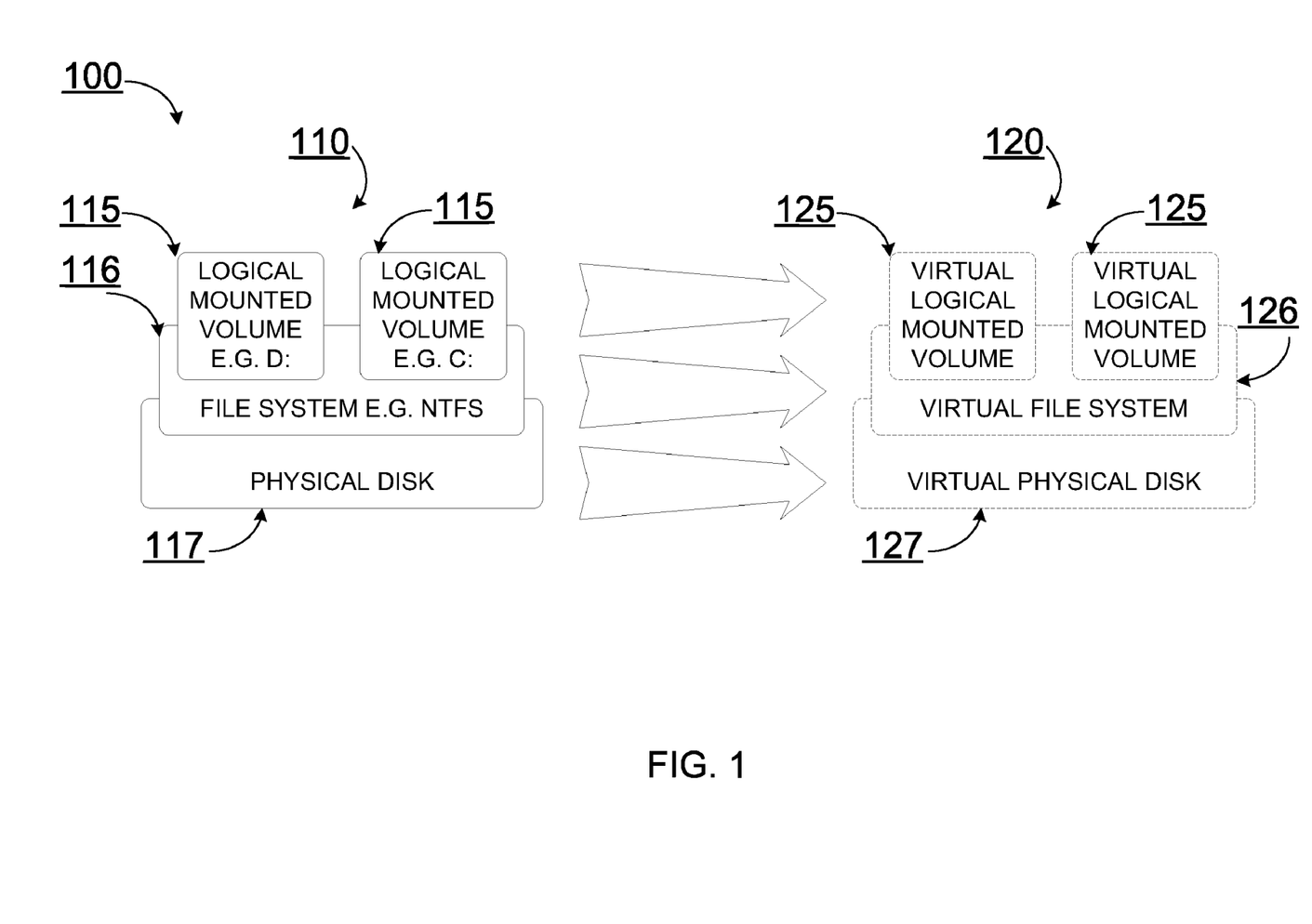
FIG. 1 is a block diagram of an exemplary architecture of a first file system stack (such as a host file system stack) and a second file system stack (such as a virtual file system stack) in an operating system of a computer.

FIG. 1 depicts an exemplary architecture 100 of a first file system stack 110 and a second file system stack 120 in an operating system of a computer Like numbered elements refer to like elements. As with all the figures, FIG. 1 is exemplary only and any number of elements may be added or deleted while still being within the scope of the present technology. Any number of any of elements 110-127 may be present in the architecture 100. The first file system stack 110 and the second file system stack 120 may each include a plurality of elements. As will be described in greater detail, the first file system stack 110 and the second file system stack 120 may each be communicatively coupled with their own separate filter sets.

According to various embodiments, the first file system stack 110 is also referred to as a host file system stack. The host file system stack 110 is configured to process one or more requests from host processes. The host file system stack 110 may include a plurality of elements, such as one or more logical mounted volumes (e.g., C: or D: volumes) 115, a host file system (e.g., NTFS, FAT32 or any other file system supported by the computer in use) 116 and a host physical disk 117.

In accordance with various embodiments of the present invention, the second file system stack 120 may also be referred to a virtual file system stack. In other words, the technology allows one to virtualize the host file system stack 110 in its entirety, thereby allowing for the creation of a virtual file system stack 120. The virtual file system stack 120 may include a plurality of elements, such as one or more virtual logical mounted volumes 125, a virtual file system 126 and a virtual physical disk 127. The virtual file system stack 120 is configured to process one or more requests from virtual processes. The term "virtual process" refers to a process that uses the virtual file system stack 120 (which is also known as the virtual file system device stack) to access the virtual file system 126.

The one or more virtual mounted volumes 125, which are devices that may represent logical "drive letters," may be configured to allow the one or more virtual processes to access data in stored memory through the virtual file system stack 120. The one or more virtual mounted volumes 125 may be configured to mimic or otherwise be act as the counterparts of the host logical mounted volume 115. The one or more virtual mounted volumes 125 may be created by the virtual file system driver as part of a mount request.

The virtual file system 126 may be a device that is created by the virtual file system driver. The virtual file system 126 is configured to mimic characteristics of a host file system 116 in all ways, including but not limited to reflecting or trampolining I/O requests, as described in greater detail in U.S. patent application Ser. No. 12/381,065 filed Mar. 5, 2009, titled "System and Method for Managing Code Isolation." The virtual file system 126 may adapt itself to mimic the personality (including personality characteristics such as file system capabilities, feature sets, restrictions, etc.) of a targeted file system (such as the host file system 116), or it can be an entirely different file system altogether.

The virtual physical disk 127 may be configured to provide an interface of a memory storage device to which the virtual file system 126 binds. The virtual physical disk 127 is configured to mimic a host physical disk 117. The virtual physical disk 127 may not need to implement any storage APIs, if the virtual file system 126 is configured to intercept and redirect all I/O requests targeted to the virtual physical disk 127. The virtual physical disk 127 may be created by the virtual file system driver, the virtual disk driver or any other driver.

The one or more virtual mounted volumes 125, file system 126, and/or the virtual physical disk 127 may choose to process or redirect an I/O request to another file system, target physical volume or logical mounted volume. For instance, an I/O request flowing through the virtual file system stack 120 may be redirected to the host physical disk 117, may be redirected to the top of a stack, may be routed to the next element in the virtual file system stack 120, or be otherwise satisfied. The top of a stack in this case may refer to the top of the host file system stack 110 (FIG. 1), the top of host stack 230 (FIG. 2), the top of the virtual file system stack 120 (FIG. 2), or the top of virtual stack 240 (FIG. 2).

Figure 2:
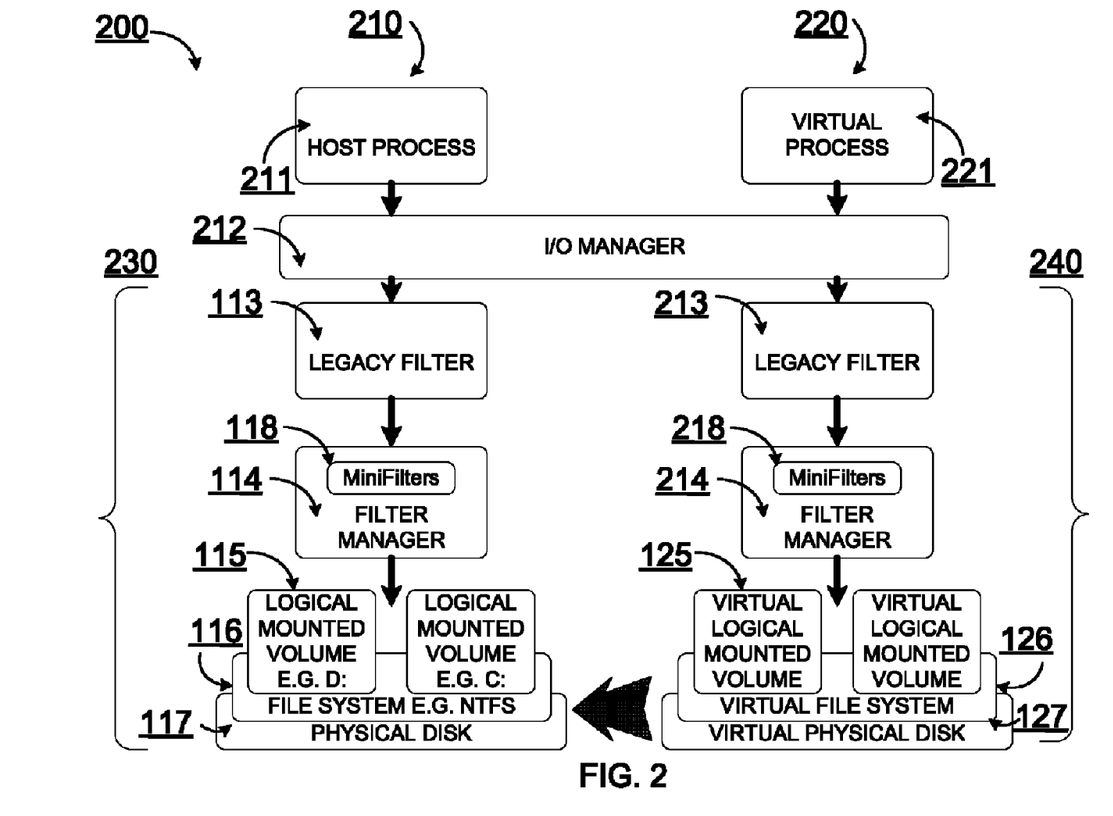
FIG. 2 is a block diagram of an exemplary architecture of a system for providing virtual stacks.

As discussed earlier, embodiments of the present technology allow for the bifurcation of I/O requests in an operating system into a separate stack (such as the virtual file system stack 120 in FIG. 1 or the virtual stack 240 in FIG. 2). Such bifurcation permits third party software components to bind to the isolated stack in a manner that provides compatibility with existing components.

FIG. 2 depicts an exemplary architecture of a system 200 for providing virtual stacks. Specifically, FIG. 2 provides an exemplary configuration of an exemplary system in a virtualization scenario, where one or more host processes 211 has a separate I/O processing from that of one or more virtual processes 221. Any number of any of elements 113-127 and 210-240 may be present in the system 200.

A first processing pipeline 210 is utilized by host processes 211, whereas a second processing pipeline 220 is employed by virtual processes 221. The first processing pipeline may be referred to the host pipeline 210, and the second processing pipeline may be referred to the virtual pipeline 220. The isolation of the second processing pipeline 220 allows for the one or more virtual processes 221 to benefit from the separate I/O stack, including any processing steps that are inserted into the virtual pipeline 220 via filtering, callbacks, or any other suitable technique or method. Also, the one or more virtual processes 221 that flow through the virtual pipeline 220 may allow for the insertion or removal of I/O filtering modules (or filters) without affecting the filtering modules applied to the one or more host processes 211.

Like the host file system stack 110 in FIG. 1, the host pipeline 210 in FIG. 2 may include a plurality of elements, such as an I/O manager 212, one or more legacy filters 113, a filter manager 114, one or more logical mounted volumes (such as C: or D: volumes) 115, a host file system (such as NTFS) 116 and a host physical disk 117. In contrast, the virtual pipeline 220 in FIG. 2 may include a plurality of elements, such as an I/O manager 212 (shared with the host pipeline 210), one or more legacy filters 213, a filter manager 214, one or more virtual logical mounted volumes 125, a virtual file system 126 and a virtual physical disk 127.

Both the host pipeline 210 and the virtual pipeline 220 may share the same I/O manager 212. The I/O manager 212 is responsible for sending I/O requests to the appropriate route for processing. The I/O manager 212 is configured to determine the context from where the I/O request came. That is, the I/O manager 212 is able to determine whether the I/O request came from a process using the virtual pipeline 220 or not (such as in the case where the I/O request came from a process using the host pipeline 210).

The host stack 230 may include a first legacy filter 113, a first filter manager 114, and all the elements in the host file system stack 110 shown in FIG. 1 (namely, the one or more logical mounted volumes 116, the host file system 116 and the host physical disk 117). A filter manager may be a component in the operating system responsible for inserting and/or removing filters reliably. A legacy filter may be a filter that operates outside the control of the filter manager. The first filter manager 114 may also host mini filters 118.

Likewise, the virtual stack 240 may include a second legacy filter 213, a second filter manager 214, and all the elements in the virtual file system stack 120 shown in FIG. 1 (namely, the one or more virtual logical mounted volumes 126, the virtual file system 126 and the virtual physical disk 127). The second legacy filter 213 may be a second copy or instance of a legacy filter, separate from the first legacy filter 113. Similarly, the second filter manager 214 may be a second copy or instance of a filter manager, separate from the first filter manager 114. Embodiments of the present technology allow for the addition of a new filter manager in the form of a second filter manager 214, isolated from the first filter manager 114. The second filter manager 214 may also host mini filters 218.

In some embodiments, the virtual stack 240 may be created by using an isolated driver loading technique to load a second copy of a filter manager. Examples of the isolated driver loading technique are more fully described in U.S. patent application Ser. No. 12/381,065 filed Mar. 5, 2009, titled "System and Method for Managing Code Isolation," which is hereby incorporated by reference. According to some embodiments, filter communication ports and filter call backs may be used in creating a virtual stack using the isolated driver loading technique.

The first and second legacy filters 113 and 213 are specific types of filter devices which may be created by filter drivers. The first and second legacy filters 113 and 213 may be any type of filtering modules, such as anti-virus, encryption and file system data monitoring applications.

In some embodiments, a file system may ultimately be considered a filtering system. The present technology allows for separate components in the host stack 230 and the virtual stack 240 to process such that the host processes 211 process independently and without interruption from the virtual processes 221, and vice versa. Furthermore, the present technology allows for both the host pipeline 210 and the virtual pipeline 220 to share the same physical disk (namely, the host physical disk 117). This is because, as mentioned earlier, I/O requests may be redirected from the targeted virtual physical disk 127 to the host physical disk 117.

According to various embodiments of the present technology, one or more host processes 211 may issue I/O requests, which will flow to the I/O manager 212. The I/O manager 212 determines that the I/O requests came from the host pipeline 210. The I/O manager 212 then allows the one or more I/O requests to flow through the first legacy filter 113 and the host filter manager 114, in order to reach the host file system 116 with the one or more logical mounted volumes 115. The host file system 116 may then redirect the I/O requests to elsewhere in the host pipeline 210, it may send the I/O request to the host physical disk 117, or it may otherwise satisfy the I/O request.

In accordance with various embodiments of the present technology, one or more virtual processes 221 may issue I/O requests, which will flow to the I/O manager 212. The I/O manager 212 determines that the I/O requests came from the virtual pipeline 220. For each of the I/O requests issued by the one or more virtual processes 221, the target device may be the one or more virtual logical mounted volumes 125. An I/O request may flow through the I/O manager 212 and through any filters managed by the virtual filter manager 124 (such as mini filters 218 and any other legacy filters 123 installed in the secondary I/O stack). The I/O request will eventually arrive at the virtual file system 126. The one or more virtual mounted volumes 125, the virtual file system 126, and/or the virtual physical disk 127 may choose to process or redirect an I/O request to another file system, target physical volume or logical mounted volume, based on heuristics or any rule implemented by the system 200. When an I/O request reaches a virtual device, the I/O request is satisfied heuristically. Each module in the virtual stack 240 may optionally choose to pre-process or post-process the I/O request as it sees fit.

Figure 3:
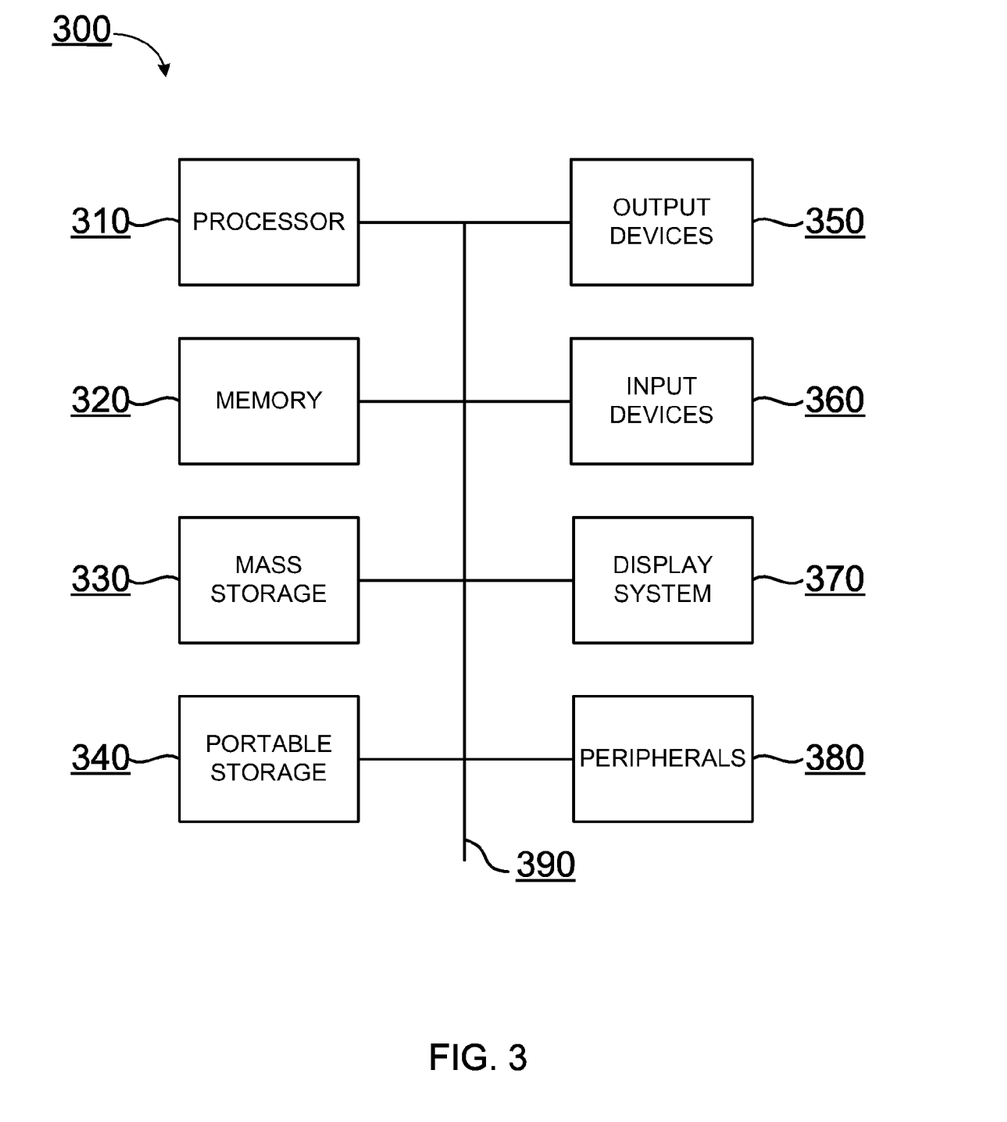
FIG. 3 is a block diagram of an exemplary computing system implementing embodiments of the present technology.

FIG. 3 illustrates an exemplary computing system 300 that may be used to implement embodiments of the present technology. Any number of any of elements 310-390 may be present in the computing system 300.

The computing system 300 may include one or more processors 310 and main memory 320. Main memory 320 stores, in part, instructions and data for execution by processor 310. Main memory 320 may store the executable code when in operation. The computing system 300 may further include a mass storage 330, portable storage medium drive(s) 340, output devices 350, input devices 360, a display system 370, and peripheral(s) 380.

The components shown in FIG. 3 are depicted as being connected via a single bus 390. The components may be connected through one or more data transport means. The processor 310 and the main memory 320 may be connected via a local microprocessor bus, and the mass storage 330, the peripherals 380, the portable storage 340, and the display system 370 may be connected via one or more input/output (I/O) buses, such as the exemplary bus 390.

The mass storage 330, which may be implemented with a magnetic disk drive or an optical disk drive, is a non-volatile storage device for storing data and instructions for use by the processor 310. The mass storage 330 may store the system software for implementing embodiments of the present invention for purposes of loading that software into the main memory 320.

The portable storage 340 operates in conjunction with a portable non-volatile storage medium, such as a floppy disk, compact disk, digital video disc, or USB storage device, to input and output data and code to and from the computer system 300 of FIG. 3. The system software for implementing embodiments of the present technology may be stored on such a portable medium and input to the computer system 300 via the portable storage 340.

The input devices 360 provide a portion of a user interface. The input devices 360 may include an alpha-numeric keypad, such as a keyboard, for inputting alpha-numeric and other information, or a pointing device, such as a mouse, a trackball, stylus, or cursor direction keys. Additionally, the computing system 300 as shown in FIG. 3 includes the output devices 350. Suitable output devices may include speakers, printers, network interfaces, and monitors.

The display system 370 may include a liquid crystal display (LCD) or other suitable display device. The display system 370 processes information it receives for output to the display device.

The peripheral(s) 380 may include any type of computer support device to add additional functionality to the computer system. The peripheral(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems can be used including Unix, Linux, Windows, Macintosh OS, Palm OS, webOS, Android, iPhone OS and other suitable operating systems.

Figure 4:
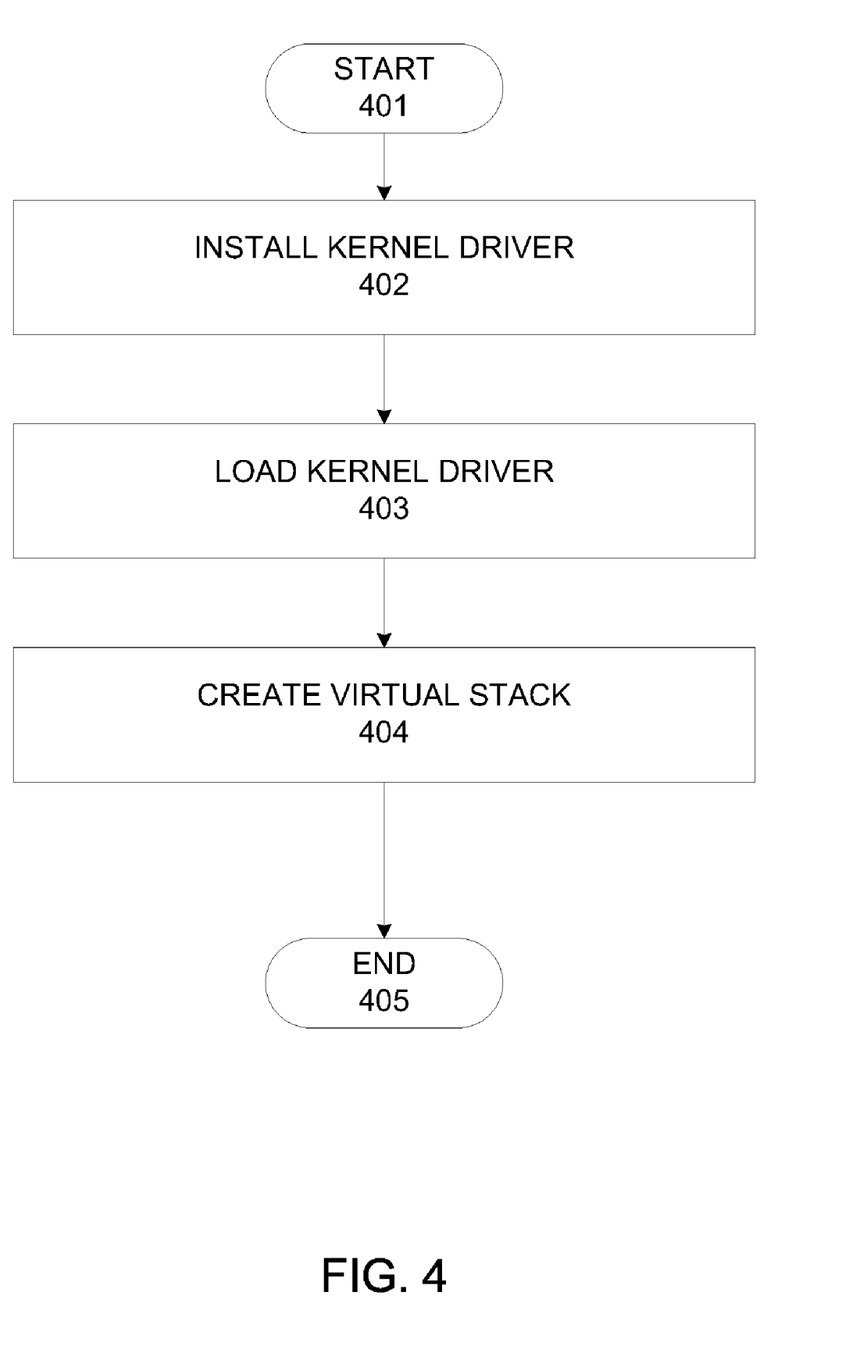
FIG. 4 is a flow chart showing an exemplary method for providing virtual stacks, according to various embodiments of the present technology.

FIG. 4 depicts an exemplary method 400 for providing a virtual file system stack. At step 401, the method 400 begins. At step 402, a kernel driver is installed by a processor executing instructions stored in a memory onto an operating system of a computer. The operating system is coupled to the processor. The kernel driver is loaded into the operating system during system boot. This requires that the "startup" parameter must be configured to indicate that the operating system should start the kernel driver during system initialization. At step 403, the kernel driver is loaded onto the operating system. If any driver (such as a kernel driver) is loaded earlier, then it may attach higher in a stack towards the top of the stack. If any driver is loaded later, it may attach lower in the stack towards the hardware.

At step 404, a virtual file system stack is created. The virtual stack in the operating system may be created by the processor. An exemplary virtual file system stack is shown as the virtual file system stack 120 in FIGS. 1 and 2. The virtual file system stack may comprise a virtual file system, a virtual physical disk device, and one or more virtual mounted volume devices. The virtual file system may be configured to adapt itself to mimic characteristics of a host file system. The virtual physical disk device may be configured for providing an interface of a memory storage device to which the virtual file system device binds. The one or more virtual mounted volume devices may be configured for allowing the one or more virtual processes to access data in stored memory through the virtual file system stack. The virtual file system stack may be augmented to include further elements, thereby forming a virtual stack (such as the virtual stack 240 of FIG. 2). Such additional elements may include an optional legacy filter (such as the second legacy filter 213 in FIG. 2) and a filter manager (such as the second filter manager 214 in FIG. 2). The method 400 ends with step 405.

The method 400 may also include the optional step of creating a host file system stack (not shown). Alternatively, the host file system stack (such as the host file system stack 110 of FIG. 1) may already exist such that this optional step is not necessary. An exemplary host file system stack is shown as the host file system stack 110 in FIGS. 1 and 2. The host file system stack is configured to process one or more requests from host processes. The host file system stack may include a host file system, a host physical disk device, and one or more logical mounted volume devices. The host file system stack may be augmented to include further elements, in order to form a host stack (such as the host stack 230 of FIG. 2). Such additional elements may include an optional legacy filter (such as the first legacy filter 113 in FIG. 2) and a filter manager (such as the first filter manager 114 in FIG. 2).

The method 400 allows for the isolation of the virtual file system stack 120 from the host file system stack 110, which is earlier depicted in FIGS. 1 and 2. By isolating the file system stacks, a first element of the virtual file system stack can only interact with a second element of the virtual file system stack. Similarly, a first element of the host file system stack can only interact with a second element of the host file system stack.

Figure 5:
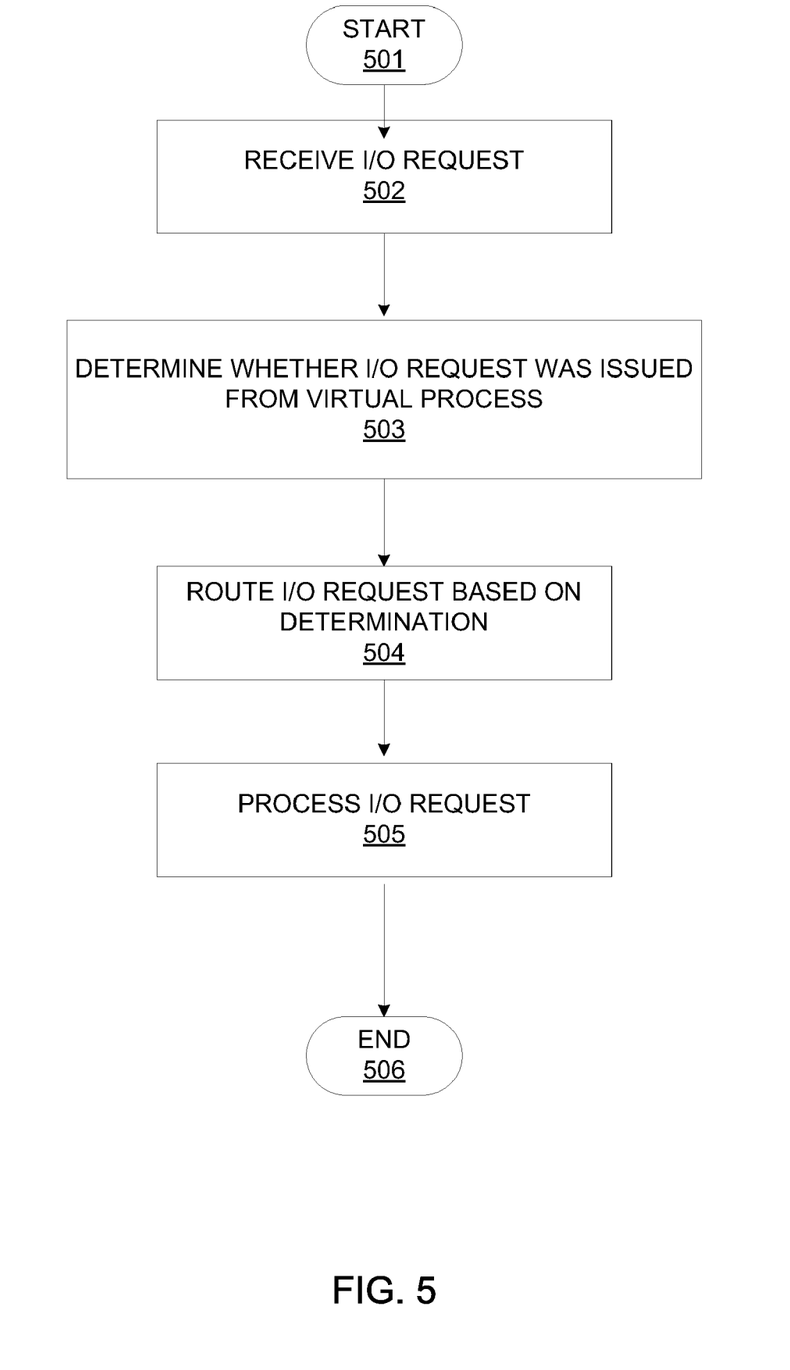
FIG. 5 is a flow chart showing an exemplary method for processing an input/output request, according to various embodiments of the present technology.

FIG. 5 depicts an exemplary method 500 for processing an input/output request, according to various embodiments of the present technology. The method 500 begins with step 501. At step 502, an I/O request is received. The I/O request may be received by a processor via an I/O manager (such as the I/O manager 212 of FIG. 2). The I/O manager is configured to manage I/O requests from both a host process and a virtual process. A determination is made by the processor whether the I/O request was issued from a virtual process at step 503. At step 504, the I/O request is routed based on the determination made at step 503. The I/O request may be routed either to a top of the virtual stack (such as the virtual stack 240 of FIG. 2) or the top of the host stack (such as the host stack 230 of FIG. 2), based on the determination. If the I/O request was issued from a virtual process in the virtual pipeline (such as the virtual pipeline 220 in FIG. 2), then the I/O request is routed to the first filter at the top of the virtual stack. If the I/O request was not issued from a virtual process, then the I/O request is routed to the first filter at the top of the host stack.

Routing the I/O request may include allowing the I/O request to flow through at least one filter managed by a virtual filter manager (such as the filter manager 214 of FIG. 2) and/or at least one legacy filter (such as the second legacy filter 213 of FIG. 2) in the virtual stack (such as the virtual stack 240 of FIG. 2). The I/O request is then processed by the operating system and the processor at step 505. Processing may mean that the I/O request is satisfied by one of a virtual file system device, a virtual physical disk, a virtual mounted volume, and any combination thereof. Processing may mean discarding the I/O request or re-queuing the I/O request into the virtual stack 240 by one of a virtual file system device, a virtual physical disk, a virtual mounted volume, and any combination thereof. Processing the I/O request may mean redirecting the I/O request by one of a virtual file system device, a virtual physical disk, a virtual mounted volume, and any combination thereof to a host file system, a target physical disk or a logical mounted volume. Finally, the method 500 ends at step 506.

Figure 6:
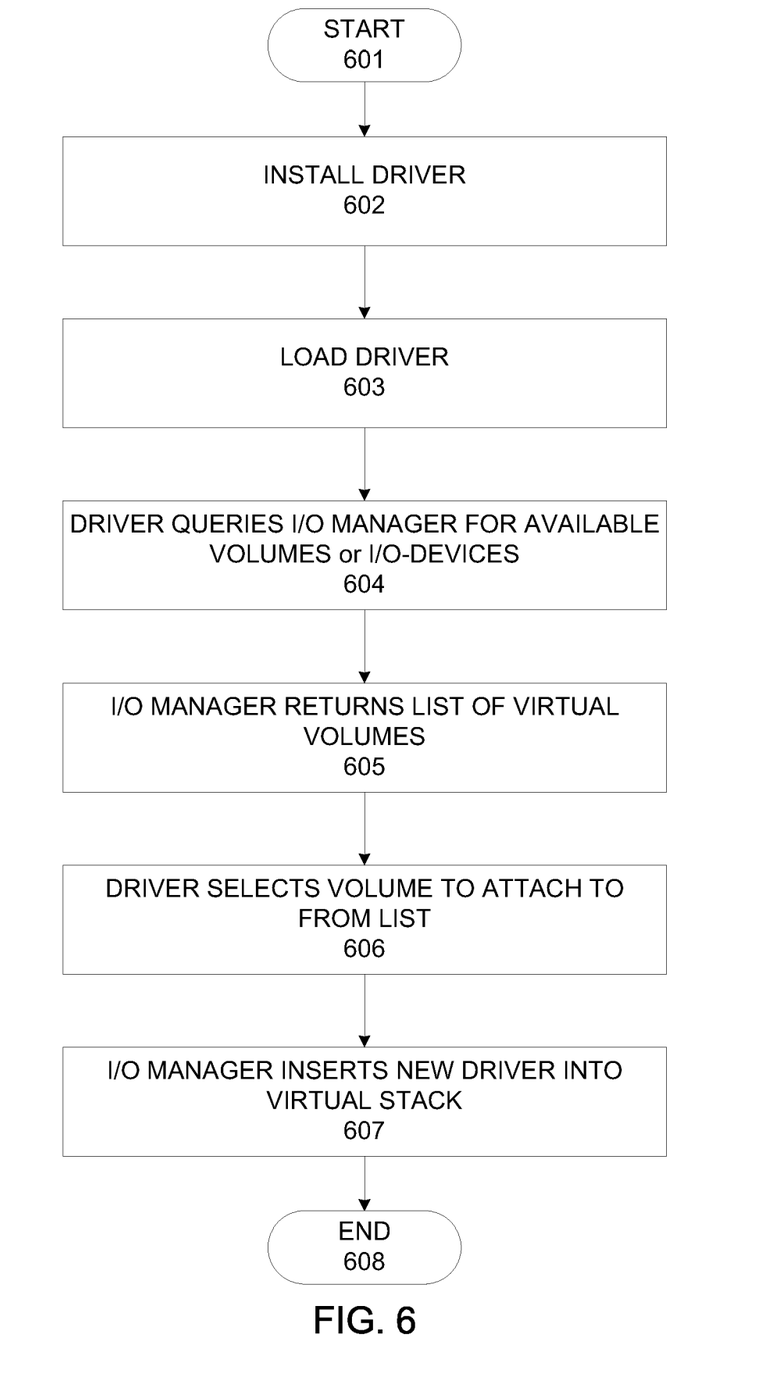
FIG. 6 is a flow chart showing an exemplary method for inserting a driver in a virtual stack, according to various embodiments of the present technology.

FIG. 6 depicts an exemplary method 600 for inserting a driver into a virtual stack, such as the exemplary virtual stack 240 shown in FIG. 2. The method begins at step 601. At step 602, the driver is installed. The unattached driver may be installed by a processor executing instructions stored in a memory onto an operating system of a computer. At step 603, the unattached driver is loaded onto the operating system. At step 604, the unattached driver queries for a list of available volumes or input/output devices in the virtual stack. This query is received by an input/output manager of the operating system. The list of virtual volumes is generated by the processor via an I/O manager (such as the I/O manager 212 of FIG. 2) in response to the query. The list is provided to the unattached driver at step 605. At step 606, the driver selects a volume to attach to from the list of available virtual volumes. At step 607, the I/O manager then inserts the driver into the virtual stack, based on the selected volume. Finally, the method 600 ends at step 608.

Some of the above-described functions may be defined by instructions that are stored on storage media (e.g., computer-readable media). The instructions may be retrieved and executed by the processor of the computer on which the system is resident. Some examples of storage media are memory devices, tapes, disks, integrated circuits, and servers. The instructions are operational when executed by the processor to direct the processor to operate in accord with the invention. Those skilled in the art are familiar with instructions, processor(s), and storage media.

It should be noted that most any hardware platform suitable for performing the processing described herein is suitable for use with various embodiments of the invention. The terms "computer-readable media" and "storage media" as used herein refer to medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise an embodiment of a bus. Transmission media may also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, a physical medium with patterns of marks or holes, a RAM, a PROM, an EPROM, an EEPROM, a FLASHEPROM, any other memory chip or cartridge, a carrier wave, or any other medium from which a computer can read.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
creating, by a computer that includes a host input/output (I/O) processing stack within an operating system, a virtual I/O processing stack within the operating system that includes a virtual file system, a virtual physical disk device, and one or more virtual mounted volume devices, wherein the virtual I/O processing stack is configured to process I/O requests issued by one or more virtual processes and share an I/O manager with the host I/O processing stack, the I/O manager being configured to route each I/O request issued by the one or more virtual processes to the virtual I/O processing stack.

2. The method of claim 1, wherein the virtual I/O processing stack further includes one or more filters, and wherein the method further comprises:
creating, by the computer, a virtual filter manager to manage the one or more filters; and
creating the host I/O processing stack within the operating system, the host I/O processing stack configured to process I/O requests issued by one or more host processes, wherein the host I/O processing stack includes a host filter manager, a host file system, a host physical disk device, and one or more logical mounted volume devices, and wherein the I/O manager is configured to route each I/O request issued by the one or more host processes to the host I/O processing stack.

3. The method of claim 2, wherein the virtual I/O processing stack is isolated from the host I/O processing stack, such that the virtual filter manager is only able to interact with one or more elements of the virtual I/O processing stack and the host filter manager is only able to interact with one or more elements of the host I/O processing stack.

4. The method of claim 1, wherein the virtual file system is configured to mimic characteristics of a host file system, wherein the virtual physical disk device is configured to provide an interface of a memory storage device to which the virtual file system device binds, and wherein the one or more virtual mounted volume devices are configured to allow the one or more virtual processes to access data in stored memory through the virtual I/O processing stack.

5. The method of claim 1, wherein processing the I/O requests issued by the one or more virtual processes includes determining whether to redirect each I/O request issued by the one or more virtual processes to a file system different than the virtual file system.

6. The method of claim 1, wherein routing each I/O request issued by the one or more virtual processes to the virtual I/O processing stack includes determining that each I/O request was issued by the virtual I/O processing stack.

7. The method of claim 3, wherein the host filter manager is configured to manage one or more second filters, wherein the one or more elements of the virtual I/O processing stack includes the one or more filters, and wherein the one or more elements of the host I/O processing stack includes the one or more second filters.

8. The method of claim 7, wherein the one or more filters includes a first antivirus product, and the one or more second filters includes a second antivirus product different from the first antivirus product.

9. A computer readable storage medium storing executable instructions configured to, when executed, cause a computing device to:
create a virtual input/output (I/O) processing stack within an operating system of the computing device, the virtual I/O processing stack including a virtual file system, a virtual physical disk device, and one or more virtual mounted volume devices, wherein the virtual I/O processing stack is configured to process I/O requests issued by one or more virtual processes and share an I/O manager with a host I/O processing stack within the operating system, the I/O manager being configured to route each I/O request issued by the one or more virtual processes to the virtual I/O processing stack.

10. The computer readable storage medium of claim 9, wherein the virtual I/O processing stack further includes one or more filters, and wherein the computer readable storage medium further stores executable instructions configured to, when executed, cause the computing device to:
create a virtual filter manager to manage the one or more filters; and
create the host I/O processing stack within the operating system, the host I/O processing stack configured to process I/O requests issued by one or more host processes, wherein the host I/O processing stack includes a host filter manager, a host file system, a host physical disk device, and one or more logical mounted volume devices, and wherein the I/O manager is configured to route each I/O request issued by the one or more host processes to the host I/O processing stack.

11. The computer readable storage medium of claim 9, wherein the virtual I/O processing stack is isolated from the host I/O processing stack such that the virtual filter manager is only able to interact with one or more elements of the virtual I/O processing stack and the host filter manager is only able to interact with one or more elements of the host I/O processing stack.

12. The computer readable storage medium of claim 9, wherein the virtual file system is configured to mimic characteristics of a host file system, wherein the virtual physical disk device is configured to provide an interface of a memory storage device to which the virtual file system device binds, and wherein the one or more virtual mounted volume devices are configured to allow the one or more virtual processes to access data in stored memory through the virtual I/O processing stack.

13. The computer readable storage medium of claim 9, wherein processing the I/O requests issued by the one or more virtual processes includes determining whether to redirect each I/O request issued by the one or more virtual processes to a file system different than the virtual file system.

14. The computer readable storage medium of claim 11, wherein the host filter manager is configured to manage one or more second filters, wherein the one or more elements of the virtual I/O processing stack includes the one or more filters, and wherein the one or more elements of the host I/O processing stack includes the one or more second filters.

15. The computer readable storage medium of claim 14, wherein the one or more filters includes a first antivirus product, and the one or more second filters includes a second antivirus product different from the first antivirus product.

16. A computer, comprising:
a processor; and
memory storing executable instructions configured to, when executed by the processor, cause the computer to:
create a host input/output (I/O) processing stack within an operating system of the computer, the host I/O processing stack including a host file system, a host physical disk device, and one or more logical mounted volume devices, wherein the host I/O processing stack is configured to process I/O requests issued by one or more host processes;
create a virtual I/O processing stack within the operating system, the virtual I/O processing stack including a virtual file system, a virtual physical disk device, and one or more virtual mounted volume devices, wherein the virtual I/O processing stack is configured to process I/O requests issued by one or more virtual processes; and
share an I/O manager with the host I/O processing stack and the virtual I/O processing stack, wherein the I/O manager is configured to route each I/O request issued by the one or more host processes to the host I/O processing stack and route each I/O request issued by the one or more virtual processes to the virtual I/O processing stack.

17. The computer of claim 16, wherein the host I/O processing stack further includes a host filter manager and the virtual I/O processing stack further includes a virtual filter manager, and wherein the virtual I/O processing stack is isolated from the host I/O processing stack such that the host filter manager is only able to interact with one or more elements of the host I/O processing stack and the virtual filter manager is only able to interact with one or more elements of the virtual I/O processing stack.

18. The computer of claim 16, wherein the virtual file system is configured to mimic characteristics of the host file system, wherein the virtual physical disk device is configured to provide an interface of a memory storage device to which the virtual file system device binds, and wherein the one or more virtual mounted volume devices are configured to allow the one or more virtual processes to access data in stored memory through the virtual I/O processing stack.

19. The computer of claim 16, wherein processing the I/O requests issued by the one or more virtual processes includes determining whether to redirect each I/O request issued by the one or more virtual processes to a file system different than the virtual file system.

20. The computer of claim 17, wherein the virtual filter manager is configured to manage one or more filters and the host filter manager is configured to manage one or more second filters, wherein the one or more filters includes a first antivirus product, and the one or more second filters includes a second antivirus product, and wherein the one or more elements of the virtual I/O processing stack includes the one or more filters, and wherein the one or more elements of the host I/O processing stack includes the one or more second filters.

* * * * *